(12) United States Patent
Paek et al.

(10) Patent No.: US 6,392,789 B1
(45) Date of Patent: May 21, 2002

(54) ERBIUM-DOPED OPTICAL FIBER HAVING GRATINGS FORMED THEREIN AND FABRICATION METHOD THEREOF

(75) Inventors: Un-Chul Paek; Young-Joo Chung, both of Kwangju-Kwangyokshi; Chang-Seok Kim, Pusan-Kwangyokshi; Young-Geun Han, Pusan-Kwangyokshl; Hyun-Soo Park, Inchon-Kwangyokshi; Kyung-Ho Kwack, Kyonggi-do, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/521,940

(22) Filed: Mar. 9, 2000

(30) Foreign Application Priority Data

Mar. 11, 1999 (KR) .............................. 99-8079

(51) Int. Cl.⁷ ................................ H01S 3/00
(52) U.S. Cl. ................ 359/341.1; 359/337.21
(58) Field of Search ........................ 359/337.21, 341.5, 359/341.4, 341.1

(56) References Cited

U.S. PATENT DOCUMENTS

| | | | |
|---|---|---|---|
| 5,337,382 A | | 8/1994 | Mizrahi |
| 5,757,540 A | * | 5/1998 | Judkins et al. ............... 359/341 |
| 5,892,615 A | | 4/1999 | Grubb et al. |
| 5,920,582 A | | 7/1999 | Byron |
| 5,966,481 A | * | 10/1999 | Jolley et al. ................... 385/28 |
| 6,134,046 A | * | 10/2000 | Shukunami et al. ........ 359/341 |
| 6,148,128 A | * | 11/2000 | Jin et al. ....................... 385/37 |

* cited by examiner

*Primary Examiner*—Mark Hellner
(74) *Attorney, Agent, or Firm*—Robert E. Bushnell, Esq.

(57) ABSTRACT

An erbium-doped optical fiber (EDF) and a fabricating method thereof The erbium-doped optical fiber has a core formed by substantially doping silica with erbium and having gratings formed therein at a predetermined period, for propagating light therethrough, and a cladding surrounding the core and having a lower refractive index than the core. Since the erbium-doped optical fiber acts as a gain flattening filter, an erbium-doped fiber amplifier formed out of the erbium-doped optical fiber obviates the need of splicing an erbium-doped optical fiber with a gain flattening filter.

20 Claims, 4 Drawing Sheets

US 6,392,789 B1

ERBIUM-DOPED OPTICAL FIBER HAVING GRATINGS FORMED THEREIN AND FABRICATION METHOD THEREOF

CLAIM OF PRIORITY

This application claims priority to an application entitled "ERBIUM-DOPED OPTICAL FIBER HAVING GRATINGS FORMED THEREIN AND FABRICATING METHOD THEREOF" filed in the Korean Industrial Property Office on Mar. 11, 1999 and assigned Serial No. 99-8079, the contents of which are hereby incorporated by reference.

BACKGROUND OF THE INVENTION

1. Field of the Invention

The present invention relates generally to an erbium-doped fiber amplifier (EDFA) for amplifying an optical signal, and in particular, to an erbium-doped fiber amplifier having a gain flattening function and a fabricating method thereof.

2. Description of the Related Art

An erbium-doped fiber amplifier (EDFA) is used to amplify an optical signal to compensate for the attenuation caused by long distance transmission of a large amount of data on a single strand of optical fiber. The erbium-doped fiber amplifier is advantageous in terms of amplification efficiency and cost because the erbium-doped fiber amplifier directly amplifies an optical signal without the need of the steps of opto-electric conversion, amplification, and then electro-optic conversion for data transmission. The erbium-doped fiber amplifier, however, has a different amplification gain at each wavelength and there is a need to flatten the gain.

For gain flattening in a conventional erbium-doped fiber amplifier, long-period fiber gratings (LPFGs) are formed in an optically sensitive fiber and the optical fiber is spliced with an erbium-doped fiber (EDF). The splicing of the optical fiber with long-period fiber gratings and the erbium-doped optical fiber with a small core radius causes loss.

Examples of erbium-doped fiber amplifiers of the contemporary art are seen in the following U.S. Patents. U.S. Pat. No. 5,337,382, to Mizrahi, entitled Article Comprising An Optical Waveguide With In-Line Refractive Index Grating, describes broadband in-line gratings in optical waveguides. The patent describes an amplifier including an Er-doped optical fiber which is illustrated with a grating toward one end of the fiber. However, the described gratings are short period, broadband gratings with high reflectivity. The grating may be a blazed grating or a tilted grating.

U.S. Pat. No. 5,892,615, to Grubb et al., entitled Output Power Enhancement In Optical Fiber Lasers, describes an optical fiber as the active amplifying medium in a fiber laser. The core of the fiber may be doped with erbium, and the core may have a long period grating formed therein. The grating is for producing a large distributed loss for suppressing the Raman frequency in the fiber. The grating has a relatively high insertion loss at the Raman frequency while simultaneously providing a relatively low insertion loss at the lasing frequency. The grating is formed near the center of the fiber and is illustrated as spaced between loops of the fiber.

U.S. Pat. No. 5,920,582, to Byron, entitled Cladding Mode Pumped Amplifier, describes an optical waveguide having an erbium-doped core, an inner cladding and an outer cladding. The inner cladding may include germanium as a dopant. A long period index grating is formed in the inner cladding, being written by an ultra violet source.

U.S. Pat. No. 5,966,481, to Jolley et al., entitled Optically Pumped Optical Waveguide Amplifier, describes an optically amplifying waveguide with a central portion doped with erbium ions. The doped central portion is provided with a long monotonically chirped period grating created by micro stretching.

SUMMARY OF THE INVENTION

It is, therefore, an object of the present invention to provide an improved erbium-doped fiber amplifier.

It is a further object of the present invention to provide an improved erbium-doped fiber for use in an erbium-doped fiber amplifier.

A still further object of the invention is to provide an erbium-doped fiber amplifier with reduced loss due to splicing.

A yet further object of the present invention is to provide an erbium-doped fiber amplifier with a gain flattening function.

A still further object of the invention is to provide an erbium-doped fiber for use in fabrication of a gain flattening erbium-doped fiber amplifier without using an extra filter.

Another object of the present invention is to provide an erbium-doped fiber amplifier having fewer parts.

These and other objects can be achieved by providing an erbium-doped optical fiber (EDF) and a fabricating method thereof. The erbium-doped optical fiber has a core formed by substantially doping silica with erbium, has gratings formed in the core at a predetermined period for propagating light therethrough, and has a cladding surrounding the core and having a lower refractive index than the core.

According to another aspect of the present invention, there is provided an erbium-doped fiber amplifier (EDFA) fabricating method. For fabrication of the erbium-doped fiber amplifier, an optical fiber preform is formed to include a core formed by substantially doping silica with erbium and a cladding substantially formed of silica. Then, an optical fiber is drawn by applying a predetermined tensile force to the optical preform and gratings are written in the drawn optical fiber by relieving residual stresses of the optical fiber through annealing of the optical fiber at a predetermined spacing.

According to a further aspect of the present invention, there is provide an erbium-doped fiber amplifier for amplifying an input optical signal. In the erbium-doped fiber amplifier, a pump light source generates a pump light at a predetermined wavelength, an optical coupler receives the pump light from the pump light source and couples the pump light with the input optical signal, and an optical fiber has a core which is formed by substantially doping silica with erbium, and has gratings formed therein at a predetermined period for amplifying the pumped optical signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will now be described with reference to the accompanying drawings. In the following description, well-known functions or constructions are not described in detail where they would obscure the description in unnecessary detail.

In an optical fiber communication system, an erbium-doped fiber amplifier directly amplifies an optical signal without opto-electric conversion and easily compensates for propagation loss. An erbium-doped fiber amplifier generally has a high gain between 1525 and 1565 nm and also between 1570 and 1610 nm if an erbium-doped optical fiber is substantially extended. Hence, two erbium-doped fiber amplifiers with different amplification bands are used together to increase an amplification band.

Figure 1:
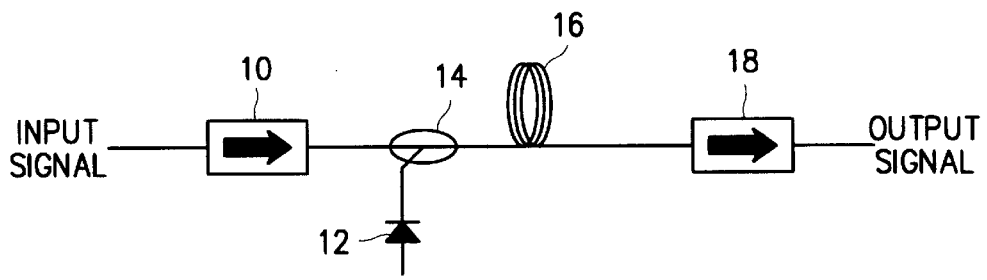
FIG. 1 illustrates a typical erbium-doped fiber amplifier.

FIG. 1 is a schematic view of a typical erbium-doped fiber amplifier. In FIG. 1, the erbium-doped fiber amplifier includes a first isolator 10, a first pump laser diode (PLD) 12, a wavelength selective coupler (WSC) 14, an erbium-doped optical fiber 16, and a second isolator 18.

In operation, a pump light with a central wavelength of 980 nm emitted from the first pump laser diode 12 and an input optical signal at 1500 nm pass through the wavelength selective coupler 14 and the erbium-doped optical fiber 16, the latter being an amplifying medium doped with a rare-earth element like erbium (Er). The pump light excites erbium ions at a ground state in the erbium-doped optical fiber 16, and then the optical signal is amplified by stimulated emission of the excited erbium. The amplified signal is output through the second isolator 18.

The first isolator 10 prevents an ASE (Amplified Spontaneous Emission) light generated from the erbium-doped optical fiber 16 from being reflected from an optical device like a signal input connector and re-input to the erbium-doped optical fiber 16, thereby preventing the resulting decrease of signal amplification efficiency which would otherwise occur. Similarly, the second isolator 18 prevents the amplified spontaneous emission light generated from the erbium-doped optical fiber 16 and re-input to the erbium-doped optical fiber 16 and the amplified signal from decreasing the amplification efficiency.

However, the erbium-doped fiber amplifier has a different amplification gain for each wavelength. In particular, the amplified spontaneous emission light at 1530 nm is high in intensity and gain. As a result, a gain for light at 1550 nm generally used for transmission is decreased and a noise figure at 1550 nm is increased, thereby widening a gain difference between wavelengths.

Figure 2:
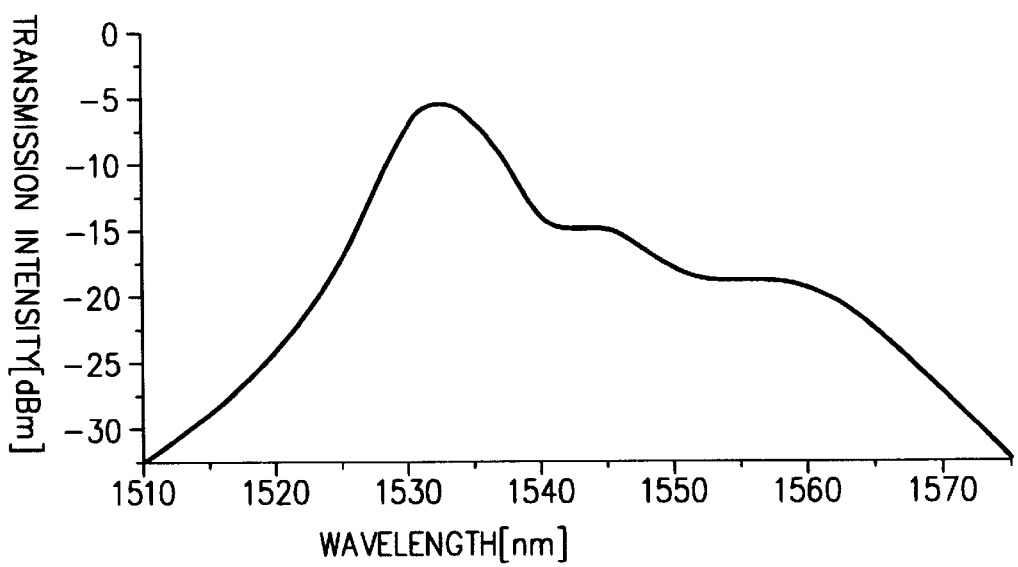
FIG. 2 is an exemplary graph showing spectral characteristics of an erbium-doped optical fiber.

FIG. 2 illustrates spectrum characteristics of an erbium-doped optical fiber when a 100 mW, 980 nm pumping laser is used. An erbium-doped fiber amplifier is a requirement for a wavelength division multiplexing (WDM) system for high speed data transmission, but exhibits a non-uniform gain profile in a wavelength band between 1530 and 1560 nm, and therefore a different gain at each wavelength division multiplexing channel.

Many methods have been suggested to flatten gains for an erbium-doped fiber amplifier. Among them, long period fiber gratings attract attention because, with use of the long-period fiber gratings for a gain flattening filter, the position and depth of a loss peak can be adjusted by a grating period and a grating length, respectively, and the bandwidth can be narrowed or widened by increasing the grating length or cascading gratings with a decreased refractive index.

A high filtering effect is not a requisite factor for gain flattening of an erbium-doped fiber amplifier. Thus, long-period fiber gratings can be written in an optical fiber with weak residual stresses by increasing exposure width and time, reducing the power density of a $CO_2$ beam, and thus partially relieving the residual stresses.

Residual stresses can be used in writing optical fiber gratings. The residual stresses result from a tensile force due to photo-elasticity, and reduce the refractive index of a core. The refractive index returns to its original level by relieving the residual stresses on the core, portion by portion, periodically by irradiating the core with a $CO_2$ laser beam, thereby forming gratings.

Residual stresses are divided into thermal stresses and mechanical stresses. The former is caused due to the difference between thermal expansion coefficients of layers, whereas the latter is produced due to the difference between viscosities of layers and closely related to tensile force. Residual stresses induced by thermal and mechanical stresses on an optical fiber can be used for fabrication of long-period fiber gratings.

Therefore, the residual stresses can be relieved using a $CO_2$ laser beam or an electrical arc. A stress-relieved portion and a stress-having portion which alternate periodically have different refractive indexes.

There will now be given a description of the formation of long-period fiber gratings in an erbium-doped optical fiber having residual stresses induced therein using a $CO_2$ laser beam or an electrical arc.

Figure 3:
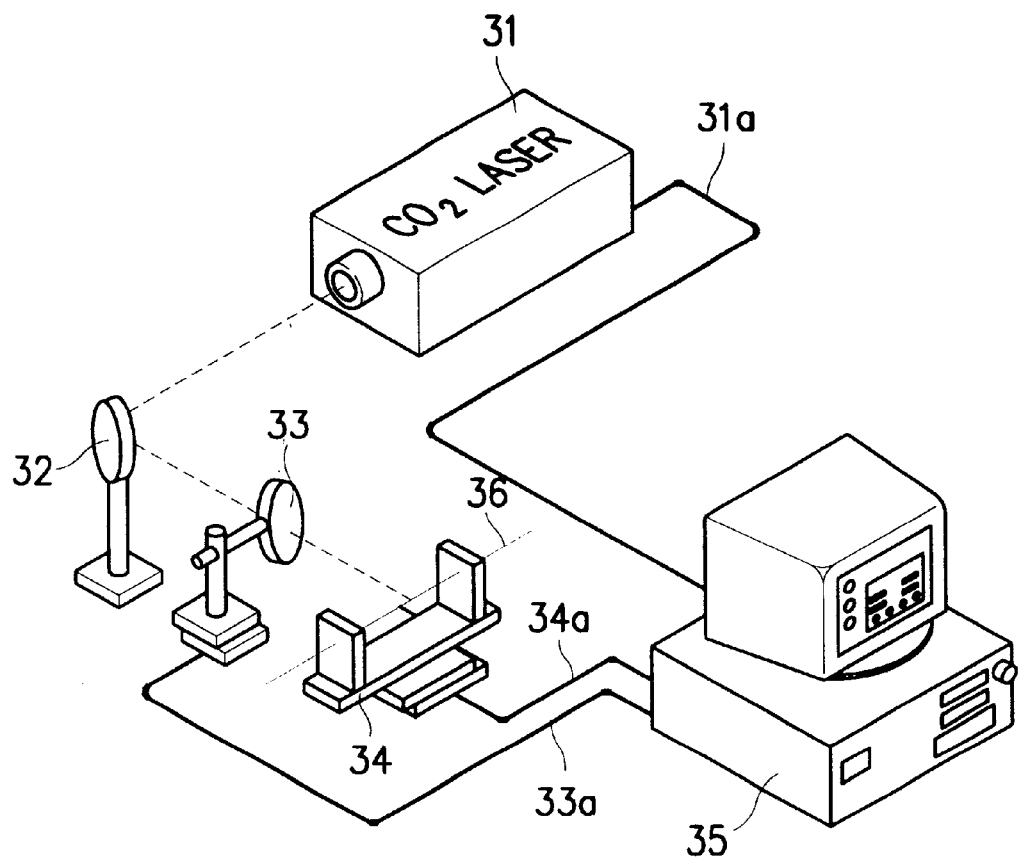
FIG. 3 is a device for forming an erbium-doped optical fiber with long-period fiber gratings using a $CO_2$ laser according to the present invention.

FIG. 3 illustrates a device for fabricating an erbium-doped optical fiber with long-period fiber gratings using a $CO_2$ laser. In FIG. 3, the device includes a $CO_2$ laser system 31, a reflective mirror 32, a lens 33, a shelf 34, and a controlling computer 35. The $CO_2$ laser system 31 is comprised of a laser head, a power module, a remote controller, and a connection cable, and emits a laser beam in pulses to allow a user to adjust its intensity and power level. The width and period of laser pulses can be controlled by the remote controller or a pulse generator connected to the remote controller. The reflective mirror 32, plated with gold, is used to control a beam path, and the lens 33, formed of ZnSe, is used to focus a laser beam in an appropriate width. The shelf 34 having a lens fixture and an erbium-doped optical fiber fixture is moved by a high resolution stepping motor. The stepping motor is controlled through GPIBs (General Purpose Interface Buses) 33a and 34a by the controlling computer 35. A white light source (not shown) and an optical spectrum analyzer (not shown) are used to observe the transmission spectrum of long-period fiber gratings during fabrication of the erbium-doped optical fiber.

Figure 4A:
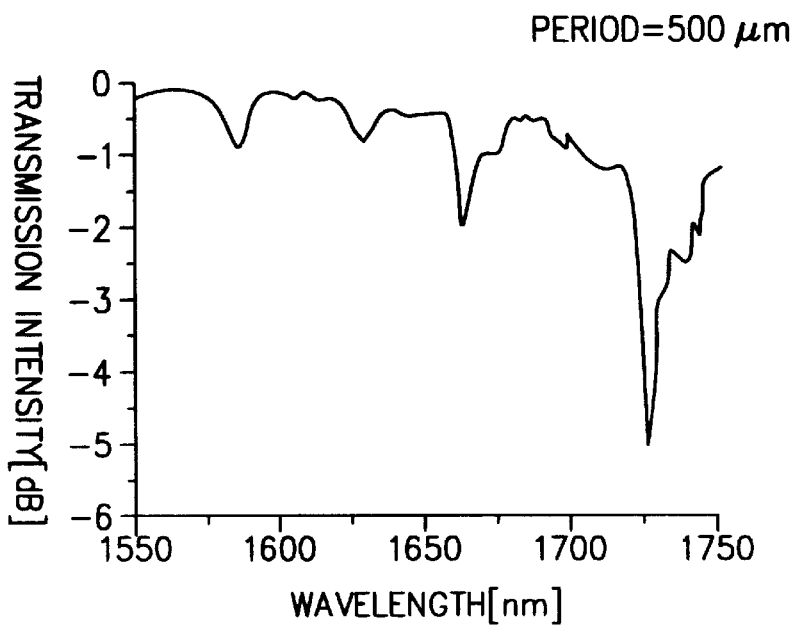
FIGS. 4A and 4B are graphs showing transmission spectrums of long-period fiber gratings in an erbium-doped fiber amplifier when grating periods are 500 and 300 μm, respectively according to the present invention.
Figure 4B:
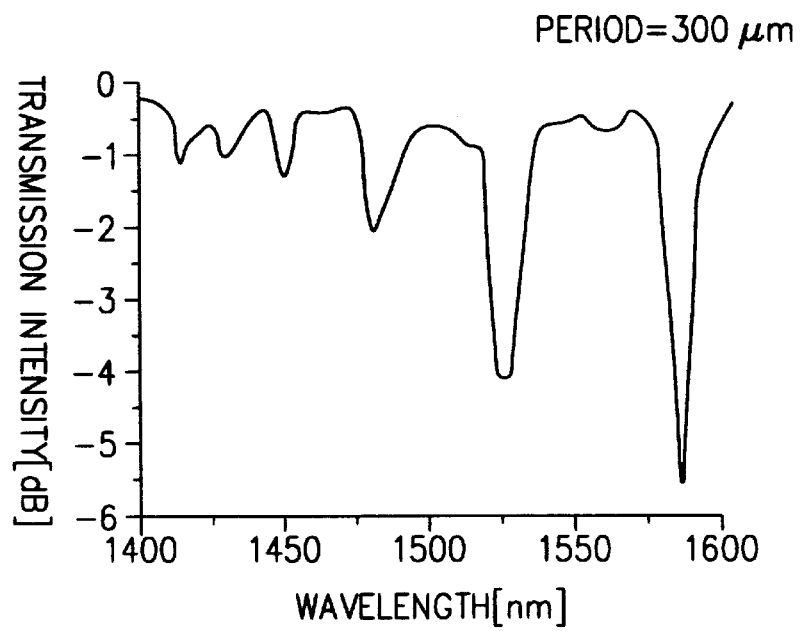

FIGS. 4A and 4B are graphs showing the transmission spectrums of long-period fiber gratings with grating periods of 500 μm and 300 μm, respectively, in an erbium-doped fiber amplifier. The manufacturing parameters of the grating are as follows: the grating length is 2 cm, the exposure time is 0.5 seconds, and the power of an output beam is 18 W (i.e., energy density=4.4 j/mm$^2$). With a grating period decreased from 500 μm to 300 μm, the position of a loss peak moves to a shorter wavelength. Hence, a gain flattening erbium-doped fiber amplifier can be fabricated by applying the $CO_2$ laser treatment to an erbium-doped optical fiber.

Figure 5:
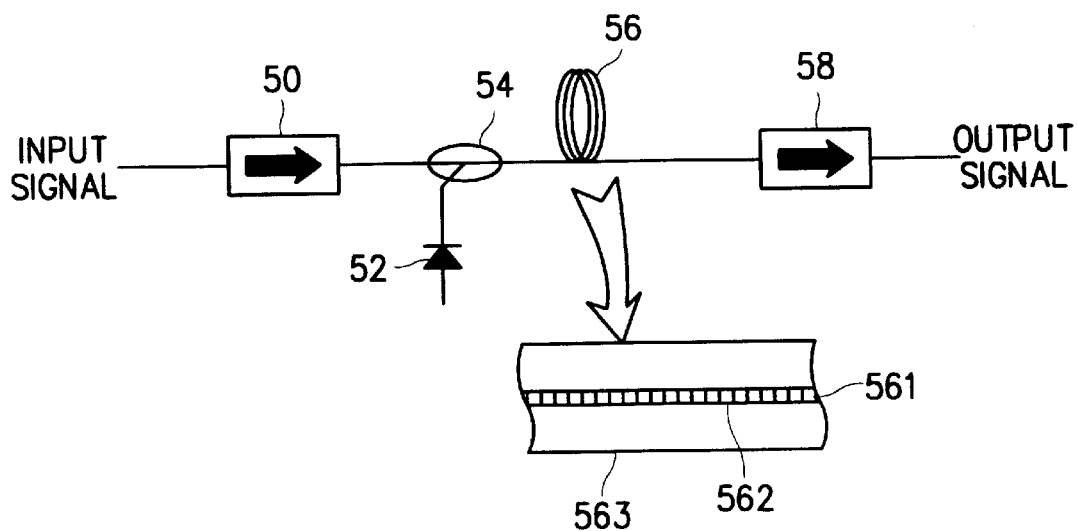
FIG. 5 illustrates an example of an erbium-doped fiber amplifier formed out of an erbium-doped optical fiber with long-period fiber gratings formed therein according to the present invention.

FIG. 5 illustrates an erbium-doped fiber amplifier formed of an erbium-doped optical fiber with long-period fiber gratings. The erbium-doped fiber amplifier includes a first isolator 50, a first pump laser diode 52, a wavelength selective coupler 54, an EDF 56, and a second isolator 58. The EDF 56 has a cladding 563 and a core 561 with long-period fiber gratings 562.

A typical erbium-doped fiber amplifier shows a non-uniform gain profile for wavelengths as shown in FIG. 2. For gain flattening, an additional gain loss should be produced at a wavelength band in the vicinity of 1530 nm showing a relatively high gain in FIG. 2. Different loss characteristics at different wavelengths can be shown as in FIGS. 4A and 4B by forming long-period fiber gratings in an erbium-doped optical fiber through control of a period and a laser intensity using a $CO_2$ laser as shown in FIG. 3. Therefore, if an erbium-doped fiber amplifier is configured to have the transmission characteristics of FIG. 2, it shows almost uniform gain characteristics between 1520 and 1560 nm by forming long-period fiber gratings in the erbium-doped optical fiber in such a way as to have the loss characteristics shown in FIG. 4B.

Figure 6:
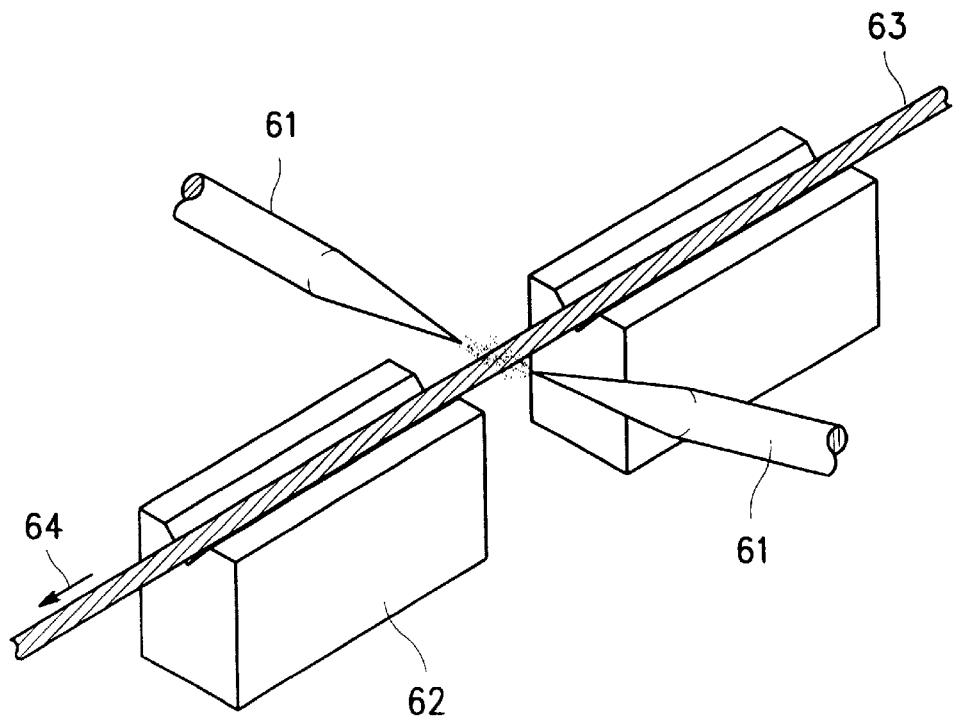
FIG. 6 illustrates a device for fabricating an erbium-doped fiber amplifier with long-period fiber gratings formed therein using the heat energy of an electric arc.

FIG. 6 illustrates a device for fabricating an erbium-doped fiber amplifier with long-period fiber gratings by relieving mechanical stresses using the heat energy of an electrical arc. A pair of electrodes 61 adjust a discharge voltage. An optical fiber 63 is placed on a V-groove block 62 and moves by a predetermined distance periodically in a direction indicated by an arrow 64.

In a comparison between an erbium-doped fiber amplifier with long-period fiber gratings formed using an electric arc and an erbium-doped fiber amplifier with long-period fiber gratings formed using a $CO_2$ laser, coupling peaks appear almost at the same position and the efficiency of the electric arc is inferior to that of the $CO_2$ laser at a coupling mode. This is because a discharge time cannot be adjusted and an annealed boundary is not clear in the electric arc method.

Meanwhile, gratings can be formed by irradiating a germanium-containing erbium-doped optical fiber with ultra violet light using a mask. That is, photosensitivity is provided to the core of an erbium-doped optical fiber, and the erbium-doped optical fiber is annealed by ultra violet light, thereby forming long-period fiber gratings in the erbium-doped optical fiber.

In accordance with the present invention as described above, an erbium-doped fiber amplifier with a gain flattening function can be fabricated by directly writing long-period fiber gratings within an erbium-doped optical fiber through partial relief of residual stresses using a $CO_2$ laser or an electric arc. Since a high filtering effect is not a requirement to gain flattening, even a small change in the refractive index of a core can bring about sufficient effects. In addition, long-period fiber gratings can be written by irradiating a germanium-including erbium-doped optical fiber with ultra violet light. Consequently, there is no need of splicing the erbium-doped optical fiber with a gain flattening filter for the gain flattening function of the erbium-doped fiber amplifier, thereby preventing splicing-induced loss.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical fiber amplifier comprising an erbium-doped fiber, said erbium-doped fiber including:

a core which is formed of silica substantially doped with erbium, and which does not have photosensitivity; and a cladding surrounding the core and having a refractive index lower than a refractive index of the core;

wherein said core has residual stress and comprises a long period grating of periodic regions of relieved stress formed in the core for creating periodic refractive index changes.

2. The optical fiber amplifier of claim 1, wherein a period of said grating is approximately 300 μm.

3. The optical fiber amplifier of claim 1, wherein said grating has a length of approximately 2 cm.

4. The optical fiber amplifier of claim 1, wherein said grating has a transmission loss of approximately 4 dB at 1530 nm.

5. The optical fiber amplifier of claim 1, said grating being formed by spatially periodic irradiation of the erbium-doped fiber with a $CO_2$ laser for relieving stress in the fiber.

6. The optical fiber amplifier of claim 1, said grating being formed by spatially periodic electrical arc discharge across the erbium-doped fiber.

7. The optical fiber amplifier of claim 5, said grating being formed by irradiating the erbium-doped fiber through a mask.

8. The optical fiber amplifier of claim 1, said optical fiber amplifier further comprising:

a first isolator for receiving an input signal of the optical amplifier;

a pump laser diode for pumping light into said erbium-doped fiber;

a wavelength selective coupler for coupling the first isolator and the pump laser diode to one end of said erbium-doped fiber;

and a second isolator connected to another end of said erbium-doped fiber for allowing passage of an output signal.

9. A method of making an optical amplifier, comprising the steps of:

providing an erbium-doped optical fiber which includes a core which is formed of silica substantially doped with erbium, and which does not have photosensitivity, and a cladding surrounding the core and having a refractive index lower than the core;

drawing the erbium-doped optical fiber so as to have residual stress in the erbium-doped optical fiber;

providing an apparatus which includes a laser for irradiating the erbium-doped optical fiber, a lens for focusing the laser beam, supporting means for supporting the erbium-doped optical fiber, moving means for moving the supporting means, and a controller for controlling the moving means;

placing the erbium-doped optical fiber in said apparatus; and periodically irradiating the erbium-doped optical fiber with said laser while moving the erbium-doped optical fiber by use of said moving means to form a long period grating of periodic refractive index changes in the core of the erbium-doped optical fiber.

10. The method of claim 9, said laser comprising a $CO_2$ laser.

11. The method of claim 9, said lens comprising a ZnSe lens.

12. The method of claim 9, said supporting means comprising a shelf.

13. The method of claim 9, said moving means comprising a stepping motor.

14. The method of claim 9, said controller comprising a computer.

15. The method of claim 9, further comprising the step of:

assembling the irradiated erbium-doped optical fiber into an erbium-doped fiber amplifier.

16. The method of claim 9, said step of periodically irradiating the erbium-doped optical fiber further comprising:

irradiating the erbium-doped optical fiber to yield a grating period of approximately 300 $\mu$m.

17. The method of claim 9, said step of periodically irradiating the erbium-doped optical fiber further comprising:

irradiating the erbium-doped optical fiber to yield a grating length of approximately 2 cm.

18. The method of claim 9, said grating being gain-flattening at approximately 1530 nm.

19. The method of claim 15, said grating having a transmission loss of approximately 4 dB at 1530 nm.

20. An erbium-doped optical fiber made by the method of claim 9.

* * * * *